US010859261B2

(12) United States Patent
Li et al.

(10) Patent No.: US 10,859,261 B2
(45) Date of Patent: Dec. 8, 2020

(54) CATALYTIC FLAMELESS COMBUSTION APPARATUS WITH EXTREMELY LOW POLLUTANT EMISSION AND COMBUSTION METHOD

(71) Applicant: DALIAN INSTITUTE OF CHEMICAL PHYSICS, CHINESE ACADEMY OF SCIENCES, Liaoning (CN)

(72) Inventors: Weizhen Li, Liaoning (CN); Zhiqiang Chen, Liaoning (CN); Jingcai Zhang, Liaoning (CN); Chuntian Wu, Liaoning (CN); Tao Zhang, Liaoning (CN)

(73) Assignee: DALIAN INSTITUTE OF CHEMICAL PHYSICS, CHINESE ACADEMY OF SCIENCES, Liaoning (CN)

( * ) Notice: Subject to any disclaimer, the term of this patent is extended or adjusted under 35 U.S.C. 154(b) by 62 days.

(21) Appl. No.: 16/093,932

(22) PCT Filed: Apr. 6, 2017

(86) PCT No.: PCT/CN2017/079511
§ 371 (c)(1),
(2) Date: Oct. 15, 2018

(87) PCT Pub. No.: WO2017/177853
PCT Pub. Date: Oct. 19, 2017

(65) Prior Publication Data
US 2019/0107278 A1    Apr. 11, 2019

(30) Foreign Application Priority Data
Apr. 14, 2016 (CN) ............ 2016 1 0231516

(51) Int. Cl.
*F23N 5/20* (2006.01)
*F23C 13/02* (2006.01)
(Continued)

(52) U.S. Cl.
CPC .............. *F23C 13/02* (2013.01); *F23C 13/00* (2013.01); *F23C 13/08* (2013.01); *F23D 14/02* (2013.01);
(Continued)

(58) Field of Classification Search
CPC .......... F23D 14/18; F23Q 11/00; F23C 13/00; F23C 13/02; F23C 13/04; F23C 13/06
(Continued)

(56) References Cited

U.S. PATENT DOCUMENTS 3,784,353 A    1/1974 Chapurin
4,000,978 A *  1/1977 Henrie ................ B01D 53/34
                                                      422/109
(Continued)

FOREIGN PATENT DOCUMENTS

CN         87217218 U    8/1988
CN          1735769 A    2/2006
(Continued)

*Primary Examiner* — Vivek K Shirsat
(74) *Attorney, Agent, or Firm* — Novick, Kim & Lee, PLLC; Allen Xue

(57) ABSTRACT

A catalytic flameless combustion apparatus has a fuel inlet, a combustion-supporting gas inlet, a gas premixer, a combustion plate, an igniter, a gas deflector, a flameless combustion cavity, a catalyst filled in the flameless combustion cavity, a gas collection chamber and an exhaust port. The method for starting the catalytic flameless combustion apparatus includes initially combusting and heating the flameless combustion cavity and the catalyst filled therein with low power flame; and then increasing flow velocity and switching to high power flame for conducting catalytic flameless (Continued)

combustion. The catalytic flameless combustion apparatus can be used for various non-solid fuel combustion and heat extraction processes.

12 Claims, 2 Drawing Sheets

(51) Int. Cl.
    *F23C 13/08*     (2006.01)
    *F23D 14/02*     (2006.01)
    *F23D 14/18*     (2006.01)
    *F23C 13/00*     (2006.01)

(52) U.S. Cl.
    CPC ........ *F23D 14/18* (2013.01); *F23C 2700/023* (2013.01); *F23C 2700/046* (2013.01); *Y02E 20/34* (2013.01)

(58) Field of Classification Search
    USPC .................. 431/170, 268, 329, 115–116
    See application file for complete search history.

(56) References Cited

U.S. PATENT DOCUMENTS

| | | | |
|---|---|---|---|
| 5,938,427 A | * | 8/1999 | Suzuki .................. F23C 6/04 |
| | | | 431/11 |
| 6,497,571 B1 | | 12/2002 | McAlonan et al. |
| 2012/0282556 A1 | | 11/2012 | Johnson |

FOREIGN PATENT DOCUMENTS

| | | |
|---|---|---|
| CN | 101796345 A | 8/2010 |
| CN | 101815905 A | 8/2010 |
| CN | 101929676 A | 12/2010 |
| CN | 203656925 U | 6/2014 |
| CN | 104964281 A | 10/2015 |
| CN | 205606542 U | 9/2016 |
| DE | 19724813 A1 | 12/1997 |
| EP | 0520913 A1 | 12/1992 |
| GB | 2347362 A | 9/2000 |

* cited by examiner

CATALYTIC FLAMELESS COMBUSTION APPARATUS WITH EXTREMELY LOW POLLUTANT EMISSION AND COMBUSTION METHOD

TECHNICAL FIELD

The present invention relates to a fuel combustion apparatus and a combustion method, and in particular to a fuel flameless combustion apparatus with extremely low nitrogen oxide emission and a combustion method.

BACKGROUND

Atmospheric pollution has become one of the major environmental problems in China in recent years. Atmospheric pollutants mainly come from the combustion of various fossil fuels. Compared with coal and fuel oil, natural gas produces significantly less pollutants such as dust and sulfur dioxide in the combustion process, and is a cleaner fuel. However, emissions of carbon monoxide (CO), hydrocarbon compound (HC) and nitrogen oxide ($NO_x$) are still in the same magnitude. Taking Beijing as an example, the existing gas boilers are equipped with traditional combustion engines. According to the results of sampling survey by relevant departments, over 85% of the gas boilers have $NO_x$ values above 150 $mg/m^3$. For the serious situation of prevention and control of atmospheric pollution, China's environmental protection laws and regulations have increasingly high requirements for the emission standards of these pollutants. For example, Beijing Emission Standard of Air Pollutants for Boiler (DB11/139-2015) has been issued in 2015, and requires that up to Apr. 1, 2017, the emission concentration of nitrogen oxide from gas boilers built in Beijing shall be reduced to be below 30 $mg/m^3$, and below 80 $mg/m^3$ for the existing gas boilers. At present, an improved combustion technology is generally adopted to reduce the production of the pollutants or eliminate the produced pollutants through a tail gas purification technology. CO and HC can be reduced greatly by lean fuel combustion by increasing the ratio of air to fuel, and can be eliminated through oxidization by adding an oxidation catalyst in the tail gas. However, at present, the combustion technology of low $NO_x$ emission still cannot meet the requirements of emission laws and regulations. A denitration device of selective catalytic reduction through urea or ammonia method needs to be installed, and has high cost and low coverage. A great number of distributed or small combustors still need to find breakthroughs in the combustion technology.

Combustion can be classified into two types according to the presence or absence of visible flame: flame combustion and flameless combustion. Flame combustion is essentially an oxidation reaction of gas with the participation of free radical. This combustion mode naturally has the following two problems: 1) incomplete combustion produces toxic and harmful gases such as formaldehyde and carbon monoxide (CO), and the utilization rate of fuel is low; and 2) combustion at high-temperature oxygen-enriched conditions will result in the production of a large number of thermodynamic $NO_x$. Flame combustion technologies mainly include the traditional diffusion combustion technology, the staged combustion technology (also known as dense-lean combustion technology), the flue gas recirculation technology, the lean combustion premixed combustion technology, etc. The traditional diffusion combustion will produce an obvious flame surface; the temperature is too high; a lot of $NO_x$ will be produced; the temperature gradient is large; the combustion is not uniform; and many incomplete combustion products are produced. The staged combustion is classified into fuel classification and air classification; dense-lean flame surfaces with lower temperature are formed; the production of $NO_x$ can be reduced; the temperature gradient is small; and fewer incomplete combustion products are produced. The flue gas recirculation is to allow external or internal flue gas to re-enter the combustion area, and use the flue gas to absorb heat and reduce the oxygen concentration, so as to reduce the combustion speed and furnace temperature, thereby reducing the production of $NO_x$, but excessive flue gas increases heat loss due to smoke exhaust. The lean fuel premixed combustion is a process of completely mixing a large amount of air and a small amount of gas on the molecular level before ignition, and organizing cyclone combustion. The flame temperature is relatively low, and the production amount of $NO_x$ is small. Due to sufficient oxygen and uniform mixing of fuel and oxygen, small quantities of carbon smoke and CO are produced and there are problems of heat loss of smoke exhaust and excessive energy consumption of a fan. The flameless combustion includes a catalytic combustion technology and a high-temperature air combustion technology. The catalytic combustion refers to the combustion purification process of combustible lower than the fuel ignition concentration in which the catalyst is added at the entrance of the combustor and fuel molecules and oxidizer molecules react on the surface of the catalyst, instead of high-concentration gas combustion and heat taking. The high-temperature air combustion refers to that the reactants exceed the spontaneous combustion temperature through preheated air, and the combustion reaction is dispersed in a wide area without local high-temperature area, so the $NO_x$ emission is low.

At present, the catalytic combustor generally adopts a downstream structure. Namely, when the fuel gas and the combustion-supporting gas flow through a catalyst layer, they have a catalytic combustion reaction; and then after they flow past the catalyst layer, they do not return. Flameless combustors adopted by the high-temperature air combustion technology also adopt the downstream structure. The high-temperature premixed air spontaneously combusts in a wide and hollow combustion chamber, and the combusted gas is discharged downstream. The downstream structure often results in that the transverse diffusion of gas molecules is limited by the premixed degree of gas and flow velocity of gas. Various pollutants with high concentrations still exist in the combustion products.

Current combustors with different powers usually use one of the technologies. The nitrogen reduction effect is limited, and cannot meet the increasingly stringent environmental protection standards and requirements, accompanied by the increase of CO emission and the decrease of thermal efficiency.

SUMMARY

The purpose of the present invention is to provide a catalytic flameless combustion apparatus with extremely low pollutant emission and a combustion method, so as to realize catalytic flameless combustion of various gases or vaporized fuels under kilowatt and megawatt powers and high combustion efficiency, with the emission concentration of pollutants being below 1 ppm.

To achieve this purpose, the present invention adopts the following technical solution:

The catalytic flameless combustion apparatus of the present invention comprises a hollow cylinder with an upper opening end and a lower closed end, wherein at least one combustion-supporting gas inlet and at least one fuel inlet are arranged on the lower end or bottom end of the cylinder; a gas premixer is arranged above the combustion-supporting gas inlet and the fuel inlet on the middle lower part of the cylinder; a combustion plate is arranged above the gas premixer; a gap is reserved between the bottom end of the cylinder and the combustion plate to form a gas premixing cavity; the gas premixer is placed in the gas premixing cavity; an igniter is arranged above the combustion plate; a gas deflector is arranged on the upper opening end of the cylinder; the gas deflector is a hollow cylindrical duct with upper and lower opening ends; the lower opening end of the cylindrical duct is in airtight connection with the upper opening end of the hollow cylinder; a flameless combustion cavity is arranged above the gas deflector; the flameless combustion cavity is a hollow container with a lower opening end and an upper closed end; the upper opening end of the gas deflector is opposite to the lower opening end of the flameless combustion cavity, i.e., the upper opening end of the gas deflector is placed below the lower opening end of the flameless combustion cavity and in the same plane or extends from the lower opening end of the flameless combustion cavity into the flameless combustion cavity; and a catalyst is filled in the middle upper part in the flameless combustion cavity. The gas premixers are more than one device with one or more than two shapes of sheet, rod, honeycomb and the like and are fixedly connected to the inner wall of the gas premixing cavity; gaps are reserved in the devices or between the devices so that gas in the premixing cavity can flow from the combustion-supporting gas inlet and the fuel inlet to the combustion plate; meanwhile, the gas premixer can also change the jet directions of combustion-supporting gas and fuel gas on part of the inside region to form turbulence to uniformly mix the gas in the premixing cavity. The combustion plate is a plate-like structure, and is provided with pores or through holes which allow the premixed gas to pass and penetrate through an upper surface and a lower surface of a plate body; the pores or through holes have one or more than two shapes of circle, square, slit or other irregular shapes; the through holes have a diameter or slit width of 0.01-10 mm; and the combustion plate has a thickness of 0.1-1000 mm. The igniter can ignite the premixed gas which passes through the combustion plate; and the igniter may be an ignition needle and/or electric heating wire. The gas premixer and the combustion plate are fixedly connected with the inner wall surface of the hollow cylinder; the catalyst is placed in the flameless combustion cavity, and is fixedly supported by a bracket on the inner wall of the flameless combustion cavity; the catalyst can partially or wholly fill the flameless combustion cavity and can adequately contact the gas which completely enters the flameless combustion cavity through an outlet of the gas deflector. The lower opening end of the gas deflector is connected with the upper opening end of the gas premixing cavity; the area of the upper opening end of the gas deflector as the outlet can be greater than, equal to or less than the area of the upper opening end of the gas premixing cavity as the outlet; the outlet of the gas deflector has one or more than two shapes of circle, square and other shapes; the outlet of the gas deflector may be one or two or more through holes; the outlet of the gas deflector is opposite to the lower opening end of the flameless combustion cavity as the inlet; the outlet size of the gas deflector is less than the inlet size of the flameless combustion cavity in any direction; the outlet of the gas deflector and the inlet of the flameless combustion cavity are projected in any plane along an airflow direction; the projection of the outlet of the gas deflector is positioned in the projection region of the inlet of the flameless combustion cavity; the cross-sectional area of the inlet of the flameless combustion cavity (perpendicular to the cross-sectional area of the airflow direction of the inlet) is 1.01-20 times of the cross-sectional area of the outlet of the deflector 7 (perpendicular to the cross-sectional area of the airflow direction of the outlet); the outlet of the gas deflector can extend into the inlet of the flameless combustion cavity, and can also be flush with or away from the inlet of the flameless combustion cavity by a distance; the reserved distance needs to ensure that the gas flowing from the outlet of the gas deflector can completely enter the inlet of the flameless combustion cavity; the section of the outlet of the gas deflector may be or may not be a plane; the flameless combustion cavity is a cavity body with one opening end; the cavity body may be a hollow cavity having semisphere or any shape and having only one opening end; the lower opening end of the flameless combustion cavity as the inlet may have one or more than two shapes of circle and other shapes; the inlet of the flameless combustion cavity may be one or two or more through holes; the caliber size at the opening in any direction is greater than the size of the outlet of the gas deflector in the same direction, i.e., the projection of the inlet of the flameless combustion cavity along the airflow direction can completely cover the projection of the outlet of the gas deflector along the airflow direction; and the section of the inlet of the flameless combustion cavity may be or may not be a plane. The catalytic flameless combustion apparatus also comprises a gas collection chamber; the gas collection chamber is a hollow container which is provided with an exhaust port; and the gas collection chamber wraps the lower opening end of the flameless combustion cavity into the hollow containing cavity. The catalytic flameless combustion apparatus also comprises a fixing bracket; the fixing bracket is used to fix the flameless combustion cavity to a position near the outlet of the gas deflector; and the fixing bracket can be fixedly connected with the hollow container in which the gas collection chamber or the gas deflector or the gas premixing cavity is positioned. the lower end of the gas collection chamber is provided with an opening; and the perimeter of the opening is in airtight connection with the outer wall surface of the hollow container in which the gas deflector or the gas premixing cavity is positioned. The flameless combustion cavity is positioned in the gas collection chamber; a gap is reserved between the inner wall surface of the gas collection chamber and the outer wall surface of the flameless combustion cavity; the cross-sectional area of the gap is more than 1 time of the cross-sectional area of the outlet of the gas deflector; combusted tail gas can be collected and discharged out through the exhaust port; the exhaust port can be installed in any position of the gas collection chamber, or more than two exhaust ports are installed in more than two positions of the gas collection chamber; and the sum of cross-sectional areas of the exhaust ports is more than 1 time of the cross-sectional area of the outlet of the gas deflector (perpendicular to the cross-sectional area of the airflow direction of the outlet). Heat transfer apparatuses can be installed in one or more than two positions in the flameless combustion cavity, on the outer wall surface of the flameless combustion cavity, in the gas collection chamber and on the outer wall surface of the gas collection chamber; and the heat transfer apparatuses can be one or more than two of a shell-and-tube heat exchanger, a finned type heat exchanger or a plate type heat exchanger.

The combustion method of the present invention comprises: controlling an excess air coefficient as 1.01-2.5 after gas and combustion-supporting gas introduced into the gas premixing cavity via the fuel inlet and the combustion-supporting gas inlet are premixed; regulating linear velocity of the premixed gas to be between tempering linear velocity and flame blowoff linear velocity according to tempering linear velocity and flame blowoff linear velocity of used fuel known by those ordinary skilled in the art; heating the flameless combustion cavity and the catalyst filled in the flameless combustion cavity to be red hot or above 600° C. after the igniter is started for ignition; then increasing linear velocity of the premixed gas to be above the flame blowoff linear velocity to extinguish the flame; meanwhile the premixed gas continuing to conduct flameless combustion on the flameless combustion cavity and the catalyst filled in the flameless combustion cavity; the airflow reaching the bottom of the combustion chamber and then returning and taking away most of heat; collecting high-temperature tail gas through the gas collection chamber; and discharging the high-temperature tail gas through the exhaust ports after heat transfer by the heat exchanger, with combustion products being carbon dioxide and/or water vapor and with emission concentration of hazardous substances such as carbon monoxide (CO), hydrocarbon compound (HC) and nitrogen oxide ($NO_x$) being lower than 1 ppm. The gas introduced through the combustion-supporting gas inlet is air, oxygen and oxygen-containing mixed gas with oxygen content of 1-99.9 vol % other than air; the gas introduced through the fuel inlet (2) is one or more than two of gaseous fuel, vaporific liquid fuel, and the above gaseous fuel and vaporific liquid fuel formed by diluting one or more than two of non-combustible gas such as air and nitrogen to a final concentration of 0.1-99.9 vol %. The gaseous fuel is one or more than two of natural gas, coal gas and liquified petroleum gas; the vaporific liquid fuel is one or more than two of gasoline, diesel fuel and the like; the catalyst comprises porous fireproof material and metal oxide active components; the porous fireproof material may be one or more than two of ceramics, quartz, spinel, carborundum and stainless steel with fibrous, granular, honeycomb or other ventilating shapes; the metal oxide active components may be one or more than two of aluminum oxide, cerium oxide, magnesium oxide, lanthanum oxide, titanium oxide, ferric oxide, manganese oxide, silicon oxide, sodium oxide, copper oxide, nickel oxide, powder blue, platinic oxide, palladium oxide, ruthenium oxide, rhodium oxide and silver oxide; and the metal oxide active components may have a mass fraction of 0.1%-85%.

The present invention has the following beneficial effects:

The present invention describes a method for starting the catalytic flameless combustion apparatus with extremely low pollutant emission, comprising initially combusting and heating the flameless combustion cavity and the catalyst filled therein with low power flame; and then increasing flow velocity and switching to high power flame for conducting catalytic flameless combustion.

The catalytic flameless combustion apparatus disclosed by the present invention can be used for combustion and heat extraction processes of various non-solid fuels such as gaseous and vaporific liquid. In accordance with the combustion method, catalytic flameless combustion can be conducted under kilowatt-level and megawatt-level power. The beneficial effects are: the fuel is completely combusted; combustion efficiency is high; and the emissions of hydrocarbon compound, carbon monoxide and nitrogen oxide in combusted tail gas are lower than 1 ppm. The catalytic flameless combustion apparatus has the characteristics of high efficiency, energy saving, environmental protection, safety, simple structure, good stability, etc.

Figure 1:
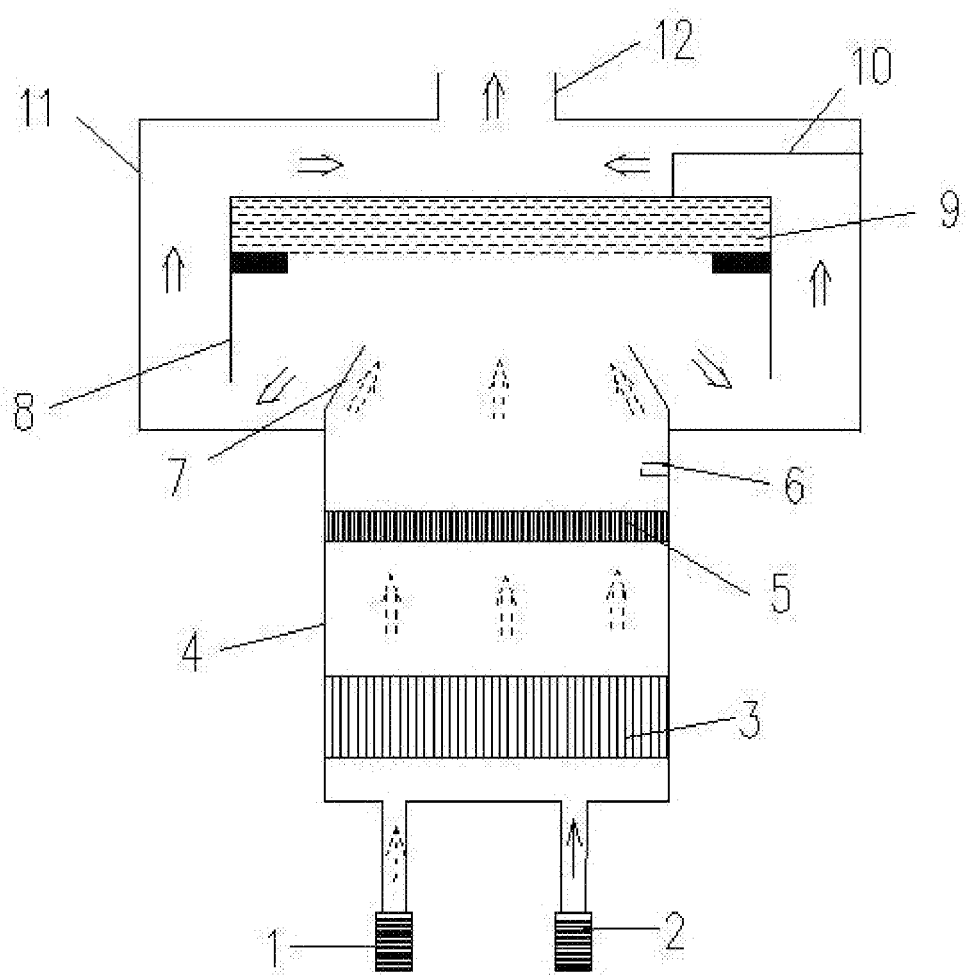
FIG. 1 is a schematic diagram of a catalytic flameless combustion apparatus according to embodiments of the present invention.

Reference Signs:

combustion-supporting gas inlet (1); fuel inlet (2); gas premixer (3); gas premixing cavity (4); combustion plate (5); igniter (6); gas deflector (7); flameless combustion cavity (8); catalyst (9); fixing bracket (10); gas collection chamber (11); and exhaust port (12).

In the figure, a single-dashed arrow represents the flow direction of air; a single-solid arrow represents the flow direction of gas; a double-dashed arrow represents the flow direction of premixed gas; and a double-solid arrow represents the flow direction of flue gas.

Figure 2:
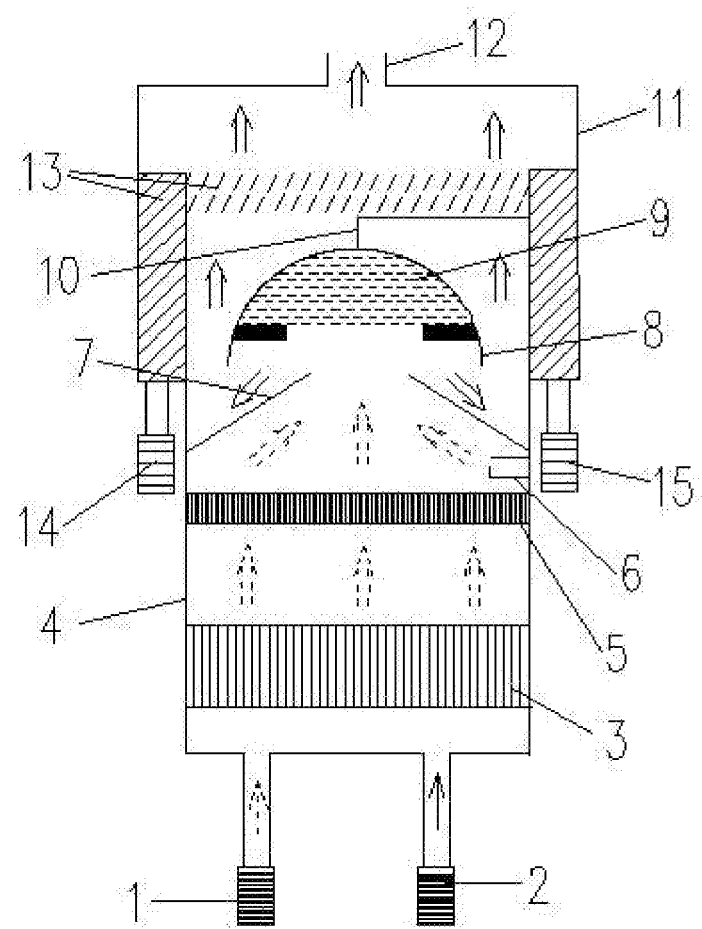

FIG. 2 is a schematic diagram of a catalytic flameless combustion apparatus with a heat exchanger according to embodiments of the present invention.

Reference Signs:

combustion-supporting gas inlet (1); fuel inlet (2); gas premixer (3); gas premixing cavity (4); combustion plate (5); igniter (6); gas deflector (7); flameless combustion cavity (8); catalyst (9); fixing bracket (10); gas collection chamber (11); exhaust port (12); finned type heat exchanger (13); heat-conducting fluid inlet (14); and heat-conducting fluid outlet (15).

In the figure, a single-dashed arrow represents the flow direction of air; a single-solid arrow represents the flow direction of gas; a double-dashed arrow represents the flow direction of premixed gas; and a double-solid arrow represents the flow direction of flue gas.

DETAILED DESCRIPTION

Embodiments of the present invention will be described below in detail. Examples of the embodiments are shown in drawings. Embodiments described below by reference to the drawings are exemplary embodiments, and are used for explaining the present invention, and shall not be understood as a limitation to the present invention.

The embodiments of the catalytic flameless combustion apparatus of the present invention are specifically described below in combination with FIG. 1 and FIG. 2.

Embodiment 1

As shown in FIG. 1, a catalytic flameless combustion apparatus comprises a hollow cylinder with an upper opening end and a lower closed end, wherein one combustion-supporting gas inlet 1 and one fuel inlet 2 are arranged on the bottom end of the cylinder; a gas premixer 3 is arranged above the combustion-supporting gas inlet 1 and the fuel inlet 2 on the middle lower part of the cylinder; a combustion plate 5 is arranged above the gas premixer 3; a gap is reserved between the bottom end of the cylinder and the combustion plate 5 to form a gas premixing cavity 4; the gas premixer 3 is placed in the gas premixing cavity 4; an igniter 6 is arranged above the combustion plate 5; a gas deflector 7 is arranged on the upper opening end of the cylinder; the gas deflector 7 is a hollow cylindrical duct with upper and lower opening ends; the lower opening end of the cylindrical duct is in airtight connection with the upper opening end of the hollow cylinder; a flameless combustion cavity 8 is arranged above the gas deflector 7; the flameless combustion cavity 8 is a hollow container with a lower opening end and an upper closed end; the upper opening end of the gas deflector 7 is opposite to the lower opening end of the flameless combustion cavity 8; the upper opening end of the gas deflector 7 extends from the lower opening end of the flameless combustion cavity 8 into the flameless combustion cavity 8; and a catalyst 9 is filled in the middle upper part in the flameless combustion cavity 8. The flameless combustion cavity 8 is fixedly connected to the hollow container in which the gas collection chamber 11 is placed through a fixing bracket 10. The gas collection chamber 11 is a hollow container which is provided with an exhaust port 12; and the gas collection chamber 11 wraps the lower opening end of the flameless combustion cavity 8 into the hollow containing cavity.

Optionally, the hollow cylinder has a diameter of 100 mm. Air enters the combustion-supporting gas inlet 1. Natural gas enters the fuel inlet 2. The gas premixer 3 is cordierite ceramics with 200 meshes and thickness of 25.4 mm. The gas is uniformly mixed in the premixing cavity 4. The combustion plate 5 is cordierite ceramics with 400 meshes. The combustion plate has a thickness of 25.4 mm. The igniter 6 can ignite the premixed gas which passes through the combustion plate 5. The outlet of the gas deflector 7 is circular, and is opposite to the inlet of the flameless combustion cavity 8. The outlet of the gas deflector 7 has a diameter of 60 mm. The cross-sectional area of the inlet of the flameless combustion cavity 8 is 1.8 times of the cross-sectional area of the outlet of the deflector 7. The outlet of the deflector 7 extends into the inlet of the flameless combustion cavity 8 by 10 mm. The section of the outlet of the gas deflector 7 is a plane. The flameless combustion cavity 8 is a cylindrical cavity with an opening end, and has a depth of 60 mm. The inlet of the flameless combustion cavity 8 is a circle with a diameter of 80 mm. The catalyst 9 is placed in the flameless combustion cavity 8, and is fixedly supported by the bracket on the inner wall of the flameless combustion cavity 8. The catalyst fills 70% of volume of the flameless combustion cavity, and can adequately contact the gas which completely enters the flameless combustion cavity 8 through the outlet of the gas deflector 7. The catalyst 9 comprises porous ceramic material and metal oxide active components with a mass fraction of 40%. The flameless combustion cavity 8 is fixed to a position near the outlet of the deflector 7 by the fixing bracket 10, and can be connected with the gas collection chamber 11 or the deflector or the premixing cavity. The gas collection chamber 11 can collect the combusted tail gas and discharge the combusted tail gas through the exhaust port 12. The exhaust port 12 can be installed on the top of the gas collection chamber 11. The cross-sectional area of the exhaust port is 2 times of the cross-sectional area of the outlet of the gas deflector 7.

Advantageously, after the combustion-supporting gas enters the combustion-supporting gas inlet 1, the combustion-supporting gas is offset with the airflow of the fuel gas which enters the fuel inlet 2 to increase a mixing effect of the combustion-supporting gas and the fuel airflow in the premixing cavity 4 through the premixer 3. The combustion plate 5 has air holes of 1 mm. The igniter 6 is an ignition needle. The deflector 7 extends into the flameless combustion cavity 8 by 15 mm. The area of the gap between the deflector 7 and the flameless combustion cavity 8 is 2.2 times of the cross-sectional area of the deflector 7. The area of the gap between the gas collection chamber and the flameless combustion cavity 8 is 2.5 times of the cross-sectional area of the deflector 7.

Embodiment 2

As shown in FIG. 2, a catalytic flameless combustion apparatus with a heat exchanger comprises a hollow cylinder with an upper opening end and a lower closed end, wherein one combustion-supporting gas inlet 1 and one fuel inlet 2 are arranged on the bottom end of the cylinder; a gas premixer 3 is arranged above the combustion-supporting gas inlet 1 and the fuel inlet 2 on the middle lower part of the cylinder; a combustion plate 5 is arranged above the gas premixer 3; a gap is reserved between the bottom end of the cylinder and the combustion plate 5 to form a gas premixing cavity 4; the gas premixer 3 is placed in the gas premixing cavity 4; an igniter 6 is arranged above the combustion plate 5; a gas deflector 7 is arranged on the upper opening end of the cylinder; the gas deflector 7 is a hollow cylindrical duct with upper and lower opening ends; the lower opening end of the cylindrical duct is in airtight connection with the upper opening end of the hollow cylinder; a flameless combustion cavity 8 is arranged above the gas deflector 7; the flameless combustion cavity 8 is a hollow semi-spherical container with a lower opening end and an upper closed end; the upper opening end of the gas deflector 7 is opposite to the lower opening end of the flameless combustion cavity 8; the upper opening end of the gas deflector 7 extends from the lower opening end of the flameless combustion cavity 8 into the flameless combustion cavity 8; and a catalyst 9 is filled in the middle upper part in the flameless combustion cavity 8. The flameless combustion cavity 8 is fixedly connected to the hollow container in which the gas collection chamber 11 is placed through a fixing bracket 10. The gas collection chamber 11 is a hollow container which is provided with an exhaust port 12; and the gas collection chamber 11 wraps the lower opening end of the flameless combustion cavity 8 into the hollow containing cavity. The finned type heat transfer apparatuses are installed above the flameless combustion cavity 8 in the gas collection chamber 11 and on the outer wall surface of the gas collection chamber 11. The water enters the heat-conducting fluid inlet 14 by using the water as heat-conducting fluid. The water flows out from the heat-conducting fluid outlet 15 after heat transfer by the finned type heat exchanger.

Optionally, the hollow cylinder has a diameter of 80 mm. Air enters the combustion-supporting gas inlet 1. Natural gas enters the fuel inlet 2. The gas premixer 3 is cordierite ceramics with 200 meshes and thickness of 12 mm. The gas is uniformly mixed in the premixing cavity 4. The combustion plate 5 is cordierite ceramics with 300 meshes. The combustion plate has a thickness of 20 mm. The igniter 6 can ignite the premixed gas which passes through the combustion plate 5. The outlet of the gas deflector 7 is circular, and is opposite to the inlet of the flameless combustion cavity 8. The outlet of the gas deflector 7 has a diameter of 50 mm. The cross-sectional area of the inlet of the flameless combustion cavity 8 is 1.5 times of the cross-sectional area of the outlet of the deflector 7. The outlet of the deflector 7 extends into the inlet of the flameless combustion cavity 8 by 5 mm. The section of the outlet of the gas deflector 7 is a plane. The flameless combustion cavity 8 is a semi-spherical cavity with an opening end, and has a depth of 40 mm. The inlet of the flameless combustion cavity 8 is a circle with a diameter of 70 mm. The catalyst 9 is placed in the flameless combustion cavity 8, and is fixedly supported by the bracket on the inner wall of the flameless combustion cavity 8. The catalyst fills 60% of volume of the flameless combustion cavity, and can adequately contact the gas which completely enters the flameless combustion cavity 8 through the outlet of the gas deflector 7. The catalyst 9 comprises porous ceramic material and metal oxide active components with a mass fraction of 30%. The flameless combustion cavity 8 is fixed to a position near the outlet of the deflector 7 by the fixing bracket 10, and can be connected with the gas collection chamber 11 or the deflector or the premixing cavity. The gas collection chamber 11 can collect the combusted tail gas and the combusted tail gas flows through the finned type heat exchanger 13. After heat transfer on the heat-conducting fluid which comes in and out through the heat-conducting fluid inlet 14 and outlet 15, the heat-conducting fluid is discharged through the exhaust port 12. The exhaust port 12 can be installed on the top of the gas collection chamber 11. The cross-sectional area of the exhaust port is 2 times of the cross-sectional area of the outlet of the gas deflector 7.

Embodiment 3

A multikilowatt natural gas catalytic flameless combustion apparatus with rated thermal power of 20 KW takes the structure shown in FIG. 2. The hollow cylinder has a diameter of 70 mm. The combustion-supporting gas inlet 1 is a stainless steel pipe with an inside diameter of 40 mm. The combustion-supporting gas is volume-adjustable air supplied by a stepless speed change blower. The gas inlet 2 is a stainless steel pipe with an inside diameter of 9 mm. The gas is flow-adjustable natural gas (methane) controlled by an electromagnetic valve. The gas premixer 3 is cordierite ceramics with 200 meshes and thickness of 12 mm. The gas is uniformly mixed in the premixing cavity 4. The combustion plate 5 is cordierite ceramics with 300 meshes. The combustion plate has a thickness of 20 mm. The premixing cavity 4 is a stainless steel pipe with an inside diameter of 65 mm. The gas deflector 7 is a circular ring connected to the inner wall of the premixing cavity 4, and has an upward oblique angle of 75 degrees and an outlet diameter of 50 mm. The outlet of the deflector 7 extends into the inlet of the flameless combustion cavity 8 by 5 mm. The section of the outlet of the gas deflector 7 is a plane. The flameless combustion cavity 8 is a semi-spherical cavity with an opening end, and has a depth of 40 mm. The inlet of the flameless combustion cavity 8 is a circle with a diameter of 70 mm. The catalyst 9 is placed in the flameless combustion cavity 8, and is fixedly supported by the bracket on the inner wall of the flameless combustion cavity 8. The catalyst fills 60% of volume of the flameless combustion cavity, and can adequately contact the gas which completely enters the flameless combustion cavity 8 through the outlet of the gas deflector 7. The catalyst 9 comprises porous ceramic material and metal oxide active components with a mass fraction of 30%. The heat exchanger 13 is placed on the upper half part of the gas collection chamber 11. The heat-conducting fluid is the water. The exhaust port is a stainless steel pipe with an inside diameter of 70 mm.

The following operation method is adopted: during ignition, the methane flow velocity is controlled as 7 L/min, and the air flow velocity is controlled as 80 L/min, i.e., the air coefficient is 1.20, linear velocity is 0.5 m/s and thermal power is about 4.6 KW. Under this combustion of low power flame, emission values of CO, HC and $NO_x$ are 0 (detector resolution is 1 ppm). After combustion for 20 s, the combustion chamber and the catalyst can be red hot. At this moment, the air coefficient is kept as 1.20. The methane flow velocity is increased as 30 L/min within 1 minute. The air flow velocity is increased as 345 L/min, i.e., the linear velocity is 2.0 m/s and the thermal power reaches 20 KW. When and after the flow is increased, the emission values of CO, HC and $NO_x$ are 0 (detector resolution is 1 ppm). After continuous combustion for 3 hours, the emission values of CO, HC and $NO_x$ are always 0. The beneficial effects realized by the multikilowatt natural gas catalytic flameless combustion apparatus with rated power of 20 KW and the above used method are: the fuel is completely combusted; heat transfer efficiency is more than 95%; and the emission values of pollutants CO, HC and $NO_x$ are 0 (lower than 1 ppm).

Embodiment 4

A multikilowatt natural gas catalytic flameless combustion apparatus with rated thermal power of 80 KW takes the structure shown in FIG. 2. The hollow cylinder has a diameter of 150 mm. The combustion-supporting gas inlet 1 is a stainless steel pipe with an inside diameter of 100 mm. The combustion-supporting gas is volume-adjustable air supplied by a stepless speed change blower. The gas inlet 2 is a stainless steel pipe with an inside diameter of 30 mm. The gas is flow-adjustable natural gas (methane) controlled by an electromagnetic valve. The gas premixer 3 is cordierite ceramics with 200 meshes and thickness of 25.4 mm. The gas is uniformly mixed in the premixing cavity 4. The combustion plate 5 is cordierite ceramics with 300 meshes. The combustion plate has a thickness of 40 mm. The premixing cavity 4 is a stainless steel pipe with an inside diameter of 150 mm. The gas deflector 7 is a circular ring connected to the inner wall of the premixing cavity 4, and has an upward oblique angle of 75 degrees and an outlet diameter of 100 mm. The outlet of the deflector 7 extends into the inlet of the flameless combustion cavity 8 by 20 mm. The section of the outlet of the gas deflector 7 is a plane. The flameless combustion cavity 8 is a semi-spherical cavity with an opening end, and has a depth of 60 mm. The inlet of the flameless combustion cavity 8 is a circle with a diameter of 160 mm. The catalyst 9 is placed in the flameless combustion cavity 8, and is fixedly supported by the bracket on the inner wall of the flameless combustion cavity 8. The catalyst fills 70% of volume of the flameless combustion cavity, and can adequately contact the gas which completely enters the flameless combustion cavity 8 through the outlet of the gas deflector 7. The catalyst 9 comprises porous ceramic material and metal oxide active components with a mass fraction of 50%. The heat exchanger 13 is placed on the upper half part of the gas collection chamber 11. The heat-conducting fluid is the water. The exhaust port is a stainless steel pipe with an inside diameter of 120 mm.

The following operation method is adopted: during ignition, the methane flow velocity is controlled as 14 L/min, and the air flow velocity is controlled as 160 L/min, i.e., the air coefficient is 1.20, linear velocity is 0.35 m/s and thermal power is about 9.3 KW. Under this combustion of low power flame, emission values of CO, HC and $NO_x$ are 0 (detector resolution is 1 ppm). After combustion for 15 s, the combustion chamber and the catalyst can be red hot. At this moment, the air coefficient is kept as 1.20. The methane flow velocity is increased as 120 L/min within 1 minute. The air flow velocity is increased as 1380 L/min, i.e., the linear velocity is 3.2 m/s and the thermal power reaches 80 KW. When and after the flow is increased, the emission values of CO, HC and $NO_x$ are 0 (detector resolution is 1 ppm). After continuous combustion for 2 hours, the emission values of CO, HC and $NO_x$ are always 0. The beneficial effects realized by the multikilowatt natural gas catalytic flameless combustion apparatus with rated power of 80 KW and the above used method are: the fuel is completely combusted; heat transfer efficiency is more than 95%; and the emission values of pollutants CO, HC and $NO_x$ are 0 (lower than 1 ppm).

Embodiment 5

A megawatt natural gas catalytic flameless combustion apparatus with rated thermal power of 1.2 MW is formed by combining 15 groups of catalytic flameless combustors each having 80 KW in embodiment 4.

Embodiment 6

A megawatt natural gas catalytic flameless combustion apparatus with rated thermal power of 2.1 MW takes the structure shown in FIG. 2. The hollow cylinder has a diameter of 400 mm. The combustion-supporting gas inlet 1 is a stainless steel pipe with an inside diameter of 200 mm. The combustion-supporting gas is volume-adjustable air supplied by a stepless speed change blower. The gas inlet 2 is a stainless steel pipe with an inside diameter of 60 mm. The gas is flow-adjustable natural gas (methane) controlled by an electromagnetic valve. The gas premixer 3 is cordierite ceramics with 200 meshes and thickness of 50 mm. The gas is uniformly mixed in the premixing cavity 4. The combustion plate 5 is cordierite ceramics with 400 meshes. The combustion plate has a thickness of 60 mm. The premixing cavity 4 is a stainless steel pipe with an inside diameter of 400 mm. The gas deflector 7 is a circular ring connected to the inner wall of the premixing cavity 4, and has an upward oblique angle of 75 degrees and an outlet diameter of 350 mm. The outlet of the deflector 7 extends into the inlet of the flameless combustion cavity 8 by 100 mm. The section of the outlet of the gas deflector 7 is a plane. The flameless combustion cavity 8 is a semi-spherical cavity with an opening end, and has a depth of 360 mm. The inlet of the flameless combustion cavity 8 is a circle with a diameter of 550 mm. The catalyst 9 is placed in the flameless combustion cavity 8, and is fixedly supported by the bracket on the inner wall of the flameless combustion cavity 8. The catalyst fills 60% of volume of the flameless combustion cavity, and can adequately contact the gas which completely enters the flameless combustion cavity 8 through the outlet of the gas deflector 7. The catalyst 9 comprises porous ceramic material and metal oxide active components with a mass fraction of 50%. The heat exchanger 13 is placed on the upper half part of the gas collection chamber 11. The heat-conducting fluid is the water. The exhaust port is a stainless steel pipe with an inside diameter of 240 mm. It should be understood in the description of the present invention that terms such as "length", "width", "thickness", "upper", "lower", "top", "bottom", "inner", "outer", "flow direction", etc. indicate direction or position relationships shown based on the drawings, and are only intended to facilitate the description of the present invention and the simplification of the description rather than to indicate or imply that the indicated device or element must have a specific direction or constructed and operated in a specific direction, and therefore, shall not be understood as a limitation to the present invention.

Although the explanatory embodiments of the present invention have been disclosed in detail with reference to the attached drawings, it should be understood that the present invention is not limited to exact embodiments. The present invention may be changed and modified by those skilled in the art without departing from the scope of the present invention as defined by the scope of the patent application and its equivalent.

We claim:

1. A catalytic flameless combustion apparatus, comprising:
    a first housing having an upper end and a lower end closed by a plate, wherein at least one combustion-supporting gas inlet and at least one fuel inlet are disposed about the lower end of the first housing;
    a gas premixer disposed inside the first housing above the combustion-supporting gas inlet and the fuel inlet;
    a combustion plate disposed inside the first housing above the gas premixer;
    wherein a space between the lower end of the first housing and the combustion plate defines a gas premixing cavity, and the gas premixer resides in the gas premixing cavity;
    an igniter disposed inside the first housing above the combustion plate;
    a gas deflector having a tubular body with a lower opening and an upper opening;
    a second housing that defines a flameless combustion cavity and has a single opening opposed to the upper opening of the gas deflector; and
    a catalyst disposed inside the second housing,
    wherein the lower opening of the gas deflector is connected to the upper end of the first housing, and
    wherein the upper opening of the gas deflector is flush with the single opening in the second housing or extends into the flameless combustion cavity through the single opening in the second housing.

2. The catalytic flameless combustion apparatus according to claim 1, wherein the gas premixer is in the shape of a sheet, a rod, or a honeycomb monolith, and is connected to an inner wall of the first housing,
    wherein, during operation, the gas premixer causes changes in a flow direction of a combustion-supporting gas and in a flow direction of a fuel gas and thereby premixing the combustion-supporting gas and the fuel gas in the premixing cavity,
    wherein the combustion plate has a planar structure having pores or through holes that allow the premixed gas to pass through the combustion plate,
    wherein the through holes have a diameter or slit width of 0.01-10 mm and the combustion plate has a thickness of 0.1-1000 mm.

3. The catalytic flameless combustion apparatus according to claim 1, wherein
    the catalyst is fixedly supported by a bracket affixed to inner wall of the second housing flameless combustion cavity.

4. The catalytic flameless combustion apparatus according to claim 1, wherein an area of the opening in the second housing is 1.01-20 times of an area of the upper opening of the gas deflector.

5. The catalytic flameless combustion apparatus according to claim 1, further comprising a third housing having one or more exhaust ports, wherein the third housing is disposed about the second housing, forming a gas collection chamber between an outer wall of the seconding housing and the inner wall of the third housing.

6. The catalytic flameless combustion apparatus according to claim 1, further comprising a fixing bracket for affixing the second housing.

7. The catalytic flameless combustion apparatus according to claim 5, wherein sectional area of the one or more exhaust ports is larger than an area of the upper opening of the gas deflector.

8. The catalytic flameless combustion apparatus according to claim 5, further comprising a heat exchanger disposed inside the second housing, on an outer wall of the second housing, or on an outer wall of the third housing, wherein the heat exchanger is a shell-and-tube heat exchanger, a finned type heat exchanger, or a plate type heat exchanger.

9. A method for operating the catalytic flameless combustion apparatus of claim 1, comprising:
    introducing an oxygen-containing combustion-supporting gas through the combusting-supporting gas inlet and a gaseous fuel through the fuel gas inlet at an air coefficient of 1.01-2.5;
    mixing air and the fuel gas in the gas premixing cavity to form a premixed gas;
    controlling a linear velocity of the premixed gas to between a tempering linear velocity and a flame blow-off linear velocity according to tempering linear velocity and flame blowoff linear velocity;
    igniting the premixed gas using the igniter;
    heating the catalyst disposed in the flameless combustion cavity to above 600° C.;
    increasing the linear velocity of the premixed gas to above the flame blowoff linear velocity to extinguish a flame;
    carrying out flameless combustion of the premixed gas on the catalyst; and
    discharging a tail gas through the one or more exhaust ports in the third housing.

10. The method according to claim 9, wherein the combustion-supporting gas is air, oxygen, or an oxygen-containing mixed gas with oxygen content of 1-99.9 vol % other than air, and wherein the gaseous fuel is natural gas, coal gas, and liquefied petroleum gas, gasoline, diesel fuel, kerosene, alcohol, or methanol.

11. The catalytic flameless combustion apparatus according to claim 1, wherein the catalyst comprises a carrier and a metal oxide active component, wherein the carrier is ceramics, quartz, spinel, carborundum, stainless steel with fibrous, granules, or a honeycomb monolith, wherein the metal oxide active components is aluminum oxide, cerium oxide, magnesium oxide, lanthanum oxide, titanium oxide, ferric oxide, manganese oxide, silicon oxide, sodium oxide, copper oxide, nickel oxide, powder blue, platinic oxide, palladium oxide, ruthenium oxide, rhodium oxide, silver oxide, or a mixture thereof, wherein the metal oxide active component has a mass percentage of 0.1%-85% of the catalyst.

12. The method according to claim 1, wherein the catalyst comprises a carrier and a metal oxide active component, wherein the carrier is ceramics, quartz, spinel, carborundum, stainless steel with fibrous, granules, or a honeycomb monolith, wherein the metal oxide active components is aluminum oxide, cerium oxide, magnesium oxide, lanthanum oxide, titanium oxide, ferric oxide, manganese oxide, silicon oxide, sodium oxide, copper oxide, nickel oxide, powder blue, platinic oxide, palladium oxide, ruthenium oxide, rhodium oxide, silver oxide, or a mixture thereof, wherein the metal oxide active component has a mass percentage of 0.1%-85% of the catalyst.

* * * * *